(12) United States Patent
Fukawa et al.

(10) Patent No.: US 8,268,918 B2
(45) Date of Patent: Sep. 18, 2012

(54) CRYSTALLINE POLYLACTIC ACID RESIN COMPOSITION AND PRODUCT MOLDED/FORMED THEREFROM

(75) Inventors: Norio Fukawa, Uji (JP); Yohei Kabashima, Uji (JP); Ken-ichi Kawada, Uji (JP); Sachiko Kokuryo, Uji (JP)

(73) Assignee: Unitika Ltd., Hyogo (JP)

( * ) Notice: Subject to any disclaimer, the term of this patent is extended or adjusted under 35 U.S.C. 154(b) by 115 days.

(21) Appl. No.: 12/451,584

(22) PCT Filed: Jun. 25, 2008

(86) PCT No.: PCT/JP2008/001646
§ 371 (c)(1),
(2), (4) Date: Nov. 19, 2009

(87) PCT Pub. No.: WO2009/004769
PCT Pub. Date: Jan. 8, 2009

(65) Prior Publication Data
US 2010/0130651 A1    May 27, 2010

(30) Foreign Application Priority Data

Jun. 29, 2007  (JP) .................................. 2007-172396

(51) Int. Cl.
*C08K 5/41* (2006.01)
(52) U.S. Cl. ...................................................... 524/161
(58) Field of Classification Search .................. 524/157, 524/158, 166, 161
See application file for complete search history.

(56) References Cited

U.S. PATENT DOCUMENTS

2007/0179253 A1* 8/2007 Matsuoka et al. ............. 525/438
2009/0275678 A1* 11/2009 Kumazawa et al. .......... 523/523

FOREIGN PATENT DOCUMENTS

| JP | 2003-128901 | 5/2003 |
| JP | 2005-299067 | 10/2005 |
| JP | 2007-126780 | 5/2007 |
| JP | 2007-130895 | 5/2007 |
| WO | 2005/068554 | 7/2005 |
| WO | 2005/085346 | 9/2005 |
| WO | 2008/075775 | 6/2008 |

* cited by examiner

*Primary Examiner* — Kriellion Sanders
(74) *Attorney, Agent, or Firm* — Fildes & Outland, P.C.

(57) ABSTRACT

There is provided a crystalline polylactic acid resin composition comprising 95 to 99.97 parts by mass of a polylactic acid resin (A) having a D-isomer content of not greater than 0.6 mol % or not less than 99.4 mol %, and 0.03 to 5 parts by mass of a crystal nucleus agent (B). There is also provided a crystalline polylactic acid resin composition prepared by melt-kneading 100 parts by mass of a polylactic acid resin (A) having a D-isomer content of not greater than 0.6 mol % or not less than 99.4 mol %, 0.01 to 20 parts by mass of a (meth)acrylate compound (C), and 0.02 to 20 parts by mass of a peroxide (D).

2 Claims, No Drawings

CRYSTALLINE POLYLACTIC ACID RESIN COMPOSITION AND PRODUCT MOLDED/FORMED THEREFROM

TECHNICAL FIELD

The present invention relates to a crystalline polylactic acid resin composition, and to a product molded/formed from the composition.

BACKGROUND ART

In general, polypropylene resins (PP), acrylonitrile-butadiene-styrene resins (ABS), polyamide resins (PA6, PA66, etc.), polyester resins (PET, PBT, etc.), polycarbonate resins (PC) and the like are used as materials for resin molded/formed products. Although products produced from any of these resins are excellent in moldability/formability and mechanical strength, these resin products lead to an increased amount of garbage when being discarded. In addition, the resin products are hardly decomposed in the natural environment and, therefore, permanently remain in the ground after landfill disposal.

In recent years, biodegradable polyester resins have come into focus from the viewpoint of environmental preservation. Among theses resins, polylactic acids, polyethylene succinates, polybutylene succinates and the like are less expensive because of its mass-productivity, and very useful. Particularly, the polylactic acids can be industrially produced from plants such as corn and sweet potato. Even if the polylactic acids are incinerated, the polylactic acids are carbon-neutral in consideration of carbon dioxide absorbed during the growth of these plants. Therefore, the polylactic acids exert a lower load to the global environment.

Where the polylactic acids are sufficiently crystallized, the polylactic acids are improved in heat resistance and, therefore, find a wide variety of applications. However, the polylactic acids per se are very slowly crystallized. Typical approaches to improvement of the crystallization speed are to add any of various crystal nucleus agents to the polylactic acid and to crosslink the polylactic acid.

A specific method for the addition of the crystal nucleus agent for the promotion of the crystallization of the polylactic acid is to add a carboxylate or a carboxylamide having a specific molecular structure to the polylactic acid as disclosed in WO2006/137397. Further, JP2006-328163A discloses addition of tricyclohexyltrimesamide to the polylactic acid. JP2003-226801A discloses addition of ethylene bis(12-hydroxystearamide) to the polylactic acid.

An exemplary method for the crosslinking of the polylactic acid for the promotion of the crystallization of the polylactic acid is to blend a methacrylate compound in the polylactic acid as disclosed, for example, in JP2003-128901A. JP2002-3709A discloses blending of an isocyanate compound in the polylactic acid.

However, even if the crystal nucleus agent is added to the polylactic acid or the polylactic acid is crosslinked, a mold temperature should be set at 90° C. to 120° C. to provide a practically sufficient crystallization speed when a product is to be injection-molded from the polylactic acid with the use of a mold.

Therefore, even if the polylactic acid is sufficiently crystallized, the molded product has a lower rigidity when being demolded by ejection. To cope with this, a molding cycle should be prolonged. As a result, the polylactic acid molded product is produced at a lower productivity than the prior art resin molded products. This significantly hampers extensive applications of the polylactic acid resins and the products molded from the polylactic acid resins.

Where the mold temperature is set at 90° C. to 120° C., a temperature difference between the mold temperature and the room temperature is increased, resulting in a greater contraction ratio of the polylactic acid molded product. Therefore, the polylactic acid molded product has limitation in applications which require a higher dimensional accuracy. The higher contraction ratio of the molded product makes it impossible to use a mold designed for existing resins, so that the mold cannot be shared.

On the other hand, use of a polylactic acid having a higher optical purity ensures the promotion of the crystallization, thereby improving the heat resistance. As stated, for example, in JP2007-051274A, it is preferred that L-lactic acid is present in a proportion of not less than 95 mol % or D-lactic acid is present in a proportion of not less than 95 mol % in the total lactic acid component for the improvement of the heat resistance.

A polylactic acid resin having an L-isomer content of 98 to 99 mol % is typically used, for example, for the injection molding of the polylactic acid resin. However, even if the polylactic acid resin having an L-isomer content falling within this range is used in combination with the crystal nucleus agent, the mold temperature should be set at 90° C. to 120° C. for the molding. That is, if the mold temperature is lower than this temperature range, the polylactic acid crystallization speed is significantly reduced, making it impossible to produce a product of the polylactic acid having a sufficient heat resistance in a practical injection molding cycle.

DISCLOSURE OF THE INVENTION

Problems to be Solved by the Invention

It is an object of the present invention to provide a crystalline polylactic acid resin composition excellent in moldability to solve the problems described above.

Means for Solving the Problems

The inventors of the present invention conducted intensive studies to solve the problems described above. As a result, the inventors found that a crystalline polylactic acid resin composition prepared by blending a crystal nucleus agent in a polylactic acid resin having an extremely low or high D-isomer content, or a crystalline polylactic acid resin composition prepared by melt-kneading an acrylate compound, a peroxide and a polylactic acid resin having an extremely low or high D-isomer content solves the aforementioned problems, and attained the present invention.

The present invention has the following aspects:

(1) A crystalline polylactic acid resin composition comprising 95 to 99.97 parts by mass of a polylactic acid resin (A) having a D-isomer content of not greater than 0.6 mol % or not less than 99.4 mol %, and 0.03 to 5 parts by mass of a crystal nucleus agent (B);

(2) A crystalline polylactic acid resin composition prepared by melt-kneading 100 parts by mass of a polylactic acid resin (A) having a D-isomer content of not greater than 0.6 mol % or not less than 99.4 mol %, 0.01 to 20 parts by mass of a (meth)acrylate compound (C), and 0.02 to 20 parts by mass of a peroxide (D);

(3) A crystalline polylactic acid resin composition prepared by melt-kneading 100 parts by mass of a polylactic acid resin (A) having a D-isomer content of not greater than 0.6 mol % or not less than 99.4 mol %, a crystal nucleus agent (B) whose content is 0.03 to 5 parts by mass based on 95 to 99.97 parts by mass of the polylactic acid resin (A), 0.01 to 20 parts by mass of a (meth)acrylate compound (C), and 0.02 to 20 parts by mass of a peroxide (D);

(4) In the crystalline polylactic acid resin composition (1) or (3), the crystal nucleus agent (B) is at least one selected from an organic amide compound, an organic hydrazide compound, a carboxylate compound, an organic sulfonate, a phthalocyanine compound, a melamine compound and an organic phosphonate.

(5) In the crystalline polylactic acid resin composition (1) or (3), the crystal nucleus agent (B) is at least one selected from N,N',N"-tricyclohexyltrimesamide, N,N'-ethylene bis (12-hydroxystrearamide), octane dicarboxylic acid dibenzoylhydrazide and a metal salt of dimethyl 5-sulfoisophthalate.

(6) Any of the crystalline polylactic acid resin compositions (1) to (5) further comprises 0.1 to 20 parts by mass of at least one reactive compound (E) selected from a carbodiimide compound, an epoxy compound and an oxazoline compound based on 100 parts by mass of the polylactic acid resin (A).

(7) A product molded/formed from any of the crystalline polylactic acid resin compositions (1) to (6).

Effects of the Invention

The present invention provides crystalline polylactic acid resin compositions which are excellent in moldability even if a mold temperature is set at a lower level than conventional mold temperatures. Since the resin compositions can be used for housings of electrical appliances, the polylactic acid resin, which is an environmentally low-load material, has an extensive application range. Therefore, the present invention has very high industrial applicability.

BEST MODE FOR CARRYING OUT THE INVENTION

The present invention will hereinafter be described in detail.

A crystalline polylactic acid resin composition according to a first aspect of the present invention comprises a polylactic acid resin (A) and a crystal nucleus agent (B).

A crystalline polylactic acid resin composition according to a second aspect of the present invention is a composition prepared by melt-kneading a polylactic acid resin (A), a (poly)acrylate compound (C) and a peroxide (D).

A crystalline polylactic acid resin composition according to a third aspect of the present invention is a composition prepared by melt-kneading a polylactic acid resin (A), a (poly)acrylate compound (C) and a peroxide (D), and comprising a crystal nucleus agent (B).

The polylactic acid resin (A) of the inventive resin compositions should have a D-isomer content of not greater than 0.6 mol % or a D-isomer content of not less than 99.4 mol %. If a polylactic acid resin having a D-isomer content falling outside this range is used, it is impossible to provide a heat-resistant product by molding at a mold temperature of 90° C. or lower. Therefore, the D-isomer content is preferably not greater than 0.3 mol % or not less than 99.7 mol %.

Where the polylactic acid resin (A) having a D-isomer content of not greater than 0.6 mol % is to be used in the present invention, it is often difficult to acquire or prepare a polylactic acid resin having a D-isomer content of less than 0.08 mol %. In the present invention, the polylactic acid resin having a D-isomer content of less than 0.08 mol % can also be used. Similarly, where the polylactic acid resin (A) having a D-isomer content of not less than 99.4 mol % is to be used, it is often difficult to acquire or prepare a polylactic acid resin having a D-isomer content of greater than 99.92 mol %. In the present invention, the polylactic acid resin having a D-isomer content of greater than 99.92 mol % can also be used.

In the present invention, the D-isomer content of the polylactic acid resin (A) is defined as the percentage (mol %) of a D-lactic acid unit in the total lactic acid units of the polylactic acid resin (A). Therefore, where the polylactic acid resin (A) has a D-isomer content of 0.6 mol %, for example, the percentage of the D-lactic acid unit is 0.6 mol % and the percentage of an L-lactic acid unit is 99.4 mol % in the polylactic acid resin (A).

As will be described later, the D-isomer content of the polylactic acid resin (A) is determined by methyl-esterifying all of L-lactic acid and D-lactic acid obtained by decomposing the polylactic acid resin (A), and analyzing the resulting methyl L-lactate and methyl D-lactate by means of a gas chromatography analyzer.

In the present invention, any of various commercially available polylactic acid resins each having a D-isomer content falling within the range specified by the present invention may be used as the polylactic acid resin (A).

Further, a polylactic acid resin prepared from a material such as L-lactide (a cyclic dimer of lactic acid) having a sufficiently low D-isomer content or D-lactide having a sufficiently low L-isomer content may be used as the polylactic acid resin (A).

In the present invention, two or more types of polylactic acid resins may be used in combination. In this case, a polylactic acid resin having a D-isomer content falling outside the range specified by the present invention, e.g., a polylactic acid resin having a D-isomer content of greater than 0.6 mol %, may be used. Where such a polylactic acid resin and the polylactic acid resin having a D-isomer content falling within the range specified by the present invention are used in combination to provide the polylactic acid resin (A), the polylactic acid resin (A) is required to have a D-isomer content of not greater than 0.6 mol %. Similarly, a polylactic acid resin having a D-isomer content of less than 99.4 mol % may be used for the polylactic acid resin (A). Where such a polylactic acid resin and the polylactic acid resin having a D-isomer content falling within the range specified by the present invention are used in combination to provide the polylactic acid resin (A), the polylactic acid resin (A) is required to have a D-isomer content of not less than 99.4 mol %.

In the present invention, the polylactic acid resin (A) preferably has a melt flow rate of 0.1 to 50 g/10 min., more preferably 0.2 to 20 g/10 min., further preferably 0.5 to 10 g/10 min., as measured at 190° C. with a load of 21.2 N (for example, as measured in conformity with JIS K7210 (Test Conditions 4)). If the melt flow rate is higher than 50 g/10 min., the melt viscosity is too low and, therefore, the resulting molded product is poorer in mechanical properties and heat resistance. If the melt flow rate is lower than 0.1 g/10 min., the operability is reduced with a higher molding load.

The polylactic acid resin (A) is produced by employing a known melt polymerization method and optionally together with a solid phase polymerization method. Exemplary methods for adjusting the melt flow rate of the polylactic acid resin (A) in the predetermined range are as follows. If the melt flow rate is too high, a small amount of a chain extension agent such as diisocyanate compound, a bisoxazoline compound, an epoxy compound or an acid anhydride is added to the polylactic acid resin (A) for increasing the molecular weight of the resin. On the other hand, if the melt flow rate is too low, a polyester resin having a higher melt flow rate or a lower molecular weight compound is mixed with the polylactic acid resin (A).

According to one aspect of the present invention, the resin composition contains the crystal nucleus agent (B) for promotion of crystallization of the polylactic acid resin (A).

A variety of crystal nucleus agents are usable as the crystal nucleus agent (B) without limitation. Exemplary commercially available crystal nucleus agents include WX-1 available from Kawaken Fine Chemicals Co., Ltd., TF-1 available from New Japan Chemical Co., Ltd., T-1287N available from Adeka Corporation, and a master batch KX238B available from Toyota Motor Corporation. Exemplary compounds for the crystal nucleus agents include an organic amide compound, an organic hydrazide compound, a carboxylate compound, an organic sulfonate, a phthalocyanine compound, a melamine compound and an organic phosphonate, at least one of which is preferably used for promoting the crystallization.

Preferred examples of the organic amide compound include compounds represented by the following general formulae (1) and (2). Preferred examples of the organic hydrazide compound include a compound represented by the general formula (3).

$$R^1\text{—(CONH—}R^2)_a \quad (1)$$

wherein $R^1$ is a saturated or unsaturated aliphatic chain having 2 to 30 carbon atoms, a saturated or unsaturated aliphatic ring or an aromatic ring; $R^2$ is an alkyl group having 1 to 18 carbon atoms, an alkenyl group having 2 to 18 carbon atoms, a cycloalkyl group or a cyloalkenyl group having 3 to 12 carbon atoms, a phenyl group, a naphthyl group or an anthryl group, or a group represented by any of the following formulae (a) to (d); at least one hydrogen atom may be substituted by a hydroxyl group; and a is an integer of 2 to 6.

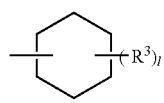
(a)

wherein $R^3$ is an alkyl group having 1 to 18 carbon atoms, an alkenyl group having 2 to 18 carbon atoms, an alkoxy group having 1 to 18 carbon atoms, a cycloalkyl group having 3 to 18 carbon atoms, a phenyl group or a halogen atom; and l is an integer of 1 to 5.

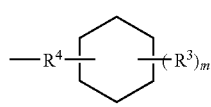
(b)

wherein $R^4$ is a straight or branched alkylene group having 1 to 4 carbon atoms; $R^5$ is the same as $R^3$; and m is an integer of 0 to 5.

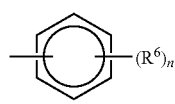
(c)

wherein $R^6$ is the same as $R^3$; and n is an integer of 1 to 5.

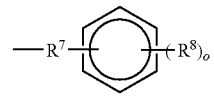
(d)

wherein $R^7$ is the same as $R^4$; $R^8$ is the same as $R^3$; and o is an integer of 0 to 6.

$$R^9\text{—(NHCO—}R^{10})_f \quad (2)$$

wherein $R^9$ is a saturated or unsaturated aliphatic chain having 2 to 30 carbon atoms, an unsaturated aliphatic ring or an aromatic ring; $R^{10}$ is the same as $R^2$; and f is an integer of 2 to 6.

$$R^{11}\text{—(CONHNHCO—}R^{12})_h \quad (3)$$

wherein $R^{11}$ is a saturated or unsaturated aliphatic chain having 2 to 30 carbon atoms, an unsaturated aliphatic ring or an aromatic ring; $R^{12}$ is the same as $R^2$; and h is an integer of 2 to 6.

Specific examples of the compounds represented by the general formulae (1) to (3) include hexamethylene bis-9,10-dihydroxystearic bisamide, p-xylylene bis-9,10-dihydroxystearamide, decane dicarboxylic acid dibenzoylhydrazide, hexane dicarboxylic acid dibenzoylhydrazide, 1,4-cyclohexane dicarboxylic acid dicyclohexylamide, 2,6-naphthalene dicarboxylic acid dianilide, N,N',N"-tricyclohexyltrimesamide, trimesic acid tris(t-butyramide), 1,4-cyclohexane dicarboxylic acid dianilide, 2,6-naphthalene dicarboxylic acid dicyclohexylamide, N,N'-dibenzoyl-1,4-diaminocyclohexane, N,N'-dicyclohexane carbonyl-1,5-diaminonaphthalene, ethylene bisstearamide, N,N'-ethylene bis(12-hydroxystearamide) and octane dicarboxylic acid dibenzoylhydrazide.

Among these, N,N',N"-tricyclohexyltrimesamide, N,N'-ethylene bis(12-hydroxystearamide) and octane dicarboxylic acid dibenzoylhydrazide are preferred, and N,N',N"-tricyclohexyltrimesamide and N,N'-ethylene bis(12-hydroxystearamide) are particularly preferred from the viewpoint of the dispersibility thereof in the resin and the heat resistance thereof.

A variety of carboxylate compounds are usable, and preferred examples thereof include aliphatic bishydroxycarboxylates.

A variety of organic sulfonates including sulfoisophthalates are usable, among which metal salts of dimethyl 5-sulfoisophthalate are preferred from the viewpoint of the crystallization promoting effect. Other preferred examples of the metal salts of dimethyl 5-sulfoisophthalate include barium, calcium, strontium, potassium, rubidium and sodium salts of dimethyl 5-sulfoisophthalate.

A variety of phthalocyanine compounds are usable, among which transition metal complexes are preferred, and copper phthalocyanine is particularly preferred from the viewpoint of the crystallization promoting effect.

A variety of melamine compounds are usable, among which melamine cyanurate is preferred from the viewpoint of the crystallization promoting effect.

Examples of the organic phosphonate preferred from the viewpoint of the crystallization promoting effect include phenyl phosphonates, among which zinc phenyl phosphonate is particularly preferred.

These compounds may be used either alone or in combination as the crystal nucleus agent (B). Any of these organic crystal nucleus agents (B) may be used in combination with an inorganic crystal nucleus agent.

In the inventive resin composition containing the polylactic acid resin (A) and the crystal nucleus agent (B), the polylactic acid resin should be present in a proportion of 95 to 99.97 parts by mass, and the crystal nucleus agent (B) should be present in a proportion of 0.03 to 5 parts by mass. It is preferred that the polylactic acid resin (A) is present in a proportion of 96 to 99.9 parts by mass and the crystal nucleus agent (B) is present in a proportion of 0.1 to 4 parts by mass. If the proportion of the crystal nucleus agent (B) is less than 0.03 parts by mass, the addition of the crystal nucleus agent (B) is less effective. On the other hand, if the proportion of the crystal nucleus agent (B) is greater than 5 parts by mass, the effect of the addition of the crystal nucleus agent is saturated, resulting in disadvantageous economy. Further, this is environmentally disadvantageous with an increased amount of residue after biodegradation.

In the present invention, the promotion of the crystallization of the polylactic acid resin (A) may be achieved by crosslinking the polylactic acid resin (A) with the (meth)acrylate compound (C) and the peroxide (D) other than by adding the crystal nucleus agent (B) to the polylactic acid resin (A). Further, the crystal nucleus agent (B) may be blended with a crosslinked polylactic acid resin prepared by crosslinking the polylactic acid resin (A) with the (meth)acrylate compound (C) and the peroxide (D).

In the present invention, the (meth)acrylate compound (C) is blended in the resin composition in order to promote the crystallization of the resin composition and improve the heat resistance as described above.

Specifically, the (meth)acrylate compound (C) is preferably a compound including two or more (meth)acrylic groups in its molecule, or at least one (meth)acrylic group and at least one glycidyl group or vinyl group, because such a compound is highly reactive with the polylactic acid resin (A), less toxic and less liable to leave a monomer and colorize the resin.

Specific examples of the (meth)acrylate compound (C) include glycidyl methacrylate, glycidyl acrylate, glycerol dimethacrylate, trimethylolpropane trimethacrylate, trimethylolpropane triacrylate, allyloxypolyethylene glycol monoacrylate, allyloxy(poly)ethylene glycol monomethacrylate, (poly)ethylene glycol dimethacrylate, (poly)ethylene glycol diacrylate, (poly)propylene glycol dimethacrylate, (poly)propylene glycol diacrylate and (poly)tetramethylene glycol dimethacrylate, and copolymers of alkylene glycols including alkylenes having different lengths, butanediol methacrylate and butanediol acrylate.

The amount of the (meth)acrylate compound (C) to be added should be 0.01 to 20 parts by mass, preferably 0.05 to 1 part by mass, based on 100 parts by mass of the polylactic acid resin (A). If the amount is less than 0.01 part by mass, it is impossible to provide the intended heat resistance. On the other hand, if the amount is greater than 20 parts by mass, the operability during the kneading is liable to be deteriorated.

In the present invention, the peroxide (D) is blended in the resin composition in order to promote a reaction between the (meth)acrylate compound (C) and the polylactic acid resin (A) and improve the heat resistance.

Specific examples of the peroxide (D) include benzoyl peroxide, bis(butylperoxy)trimethylcyclohexane, bis(butylperoxy)cyclododecane, butyl bis(butylperoxy)valerate, dicumyl peroxide, butyl peroxybenzoate, dibutyl peroxide, bis(butylperoxy)diisopropylbenzene, dimethyldi(butylperoxy)hexane, dimethyldi(butylperoxy)hexyne and butylperoxycumene.

The amount of the peroxide (D) to be added should be 0.02 to 20 parts by mass, preferably 0.1 to 10 parts by mass, based on 100 parts by mass of the polylactic acid resin (A). If the amount is less than 0.02 parts by mass, it is impossible to provide the intended effect. If the amount is greater than 20 parts by mass, the operability during the kneading is liable to be deteriorated.

The peroxide (D) is liable to be decomposed when being mixed with the resin. Therefore, even if the peroxide (D) is blended, the resulting resin composition often contains no peroxide.

The method of mixing the polylactic acid resin (A) and the crystal nucleus agent (B), the method of melt-kneading the polylactic acid resin (A), the (meth)acrylate compound (C) and the peroxide (D), and the method of blending a reactive compound (E) to be described later with these compounds are not particularly limited. A melt-kneading by means of a single-screw or twin-screw extruder may be used. In order to improve the kneading state, the twin-screw extruder is preferably used. The kneading temperature is preferably (the melting point of the polylactic acid resin (A)+5° C.) to (the melting point of the polylactic acid resin (A)+100° C.), and the kneading period is preferably 20 seconds to 30 minutes. If the kneading temperature is lower than the aforementioned range or the kneading period is shorter than the aforementioned range, the kneading and the reaction are likely to be insufficient. On the other hand, if the kneading temperature is higher than the aforementioned range or the kneading period is longer than the aforementioned range, the decomposition and the coloration of the resin are likely to occur.

In the present invention, the resin composition preferably further contains the following reactive compound (E). The reactive compound (E) improves the durability of the resin composition, and stably maintains the flame resistance and the heat resistance for a long period of time.

In the present invention, the reactive compound (E) is at least one selected from a carbodiimide compound, an epoxy compound and an oxazoline compound.

A variety of carbodiimide compounds are usable. More specifically, the carbodiimide compound is not particularly limited, as long as the carbodiimide compound has at least one carbodiimide group in its molecule. Any carbodiimide compounds falling within this category, for example, aliphatic monocarbodiimides, aliphatic polycarbodiimides, alicyclic monocarbodiimides, alicyclic polycarbodiimides, aromatic monocarbodiimides and aromatic polycarbodiimides are usable. Further, the carbodiimide compound may have a heterocyclic group or a functional group in its molecule.

Further, a carbodiimide compound having an isocyanate group in its molecule and a carbodiimide compound having no isocyanate group in its molecule may be used as the carbodiimide compound with no distinction.

Exemplary carbodiimide skeletons for the carbodiimide compounds include N,N'-di-o-tolylcarbodiimide, N,N'-dioctyldecylcarbodiimide, N,N'-di-2,6-dimethylphenylcarbodiimide, N-tolyl-N'-cyclohexylcarbodiimide, N-tolyl-N'-phenylcarbodiimide, N,N'-di-p-nitrophenylcarbodiimide, N,N'-di-p-hydroxyphenylcarbodiimide, N,N'-dicyclohexylcarbodiimide, N,N'-di-p-tolylcarbodiimide, p-phenylene-bis(di-o-tolylcarbodiimide), 4,4'-dicyclohexylmethane carbodiimide, tetramethylxylylenecarbodiimide, N,N-dimethylphenylcarbodiimide, N,N'-di-2,6-diisopropylphenylcarbodiimide, and many other carbodiimide skeletons.

Specific examples of the carbodiimide compound include alicyclic monocarbodiimides such as dicyclohexylcarbodiimide, alicyclic polycarbodiimides such as polycarbondiimides derived from 4,4'-dicyclohexylmethane diisocyanate, aromatic monocarbodiimides such as N,N'-diphenylcarbodiimide and N,N'-di-2,6-diisopropylphenylcarbodiimide, aromatic polycarbodiimides such as polycarbodiimides derived from phenylene-p-diisocyanate and polycarbodiimides derived from 1,3,5-triisopropylphenylene-2,4-diisocyanate, and many other carbodiimide compounds.

The polycarbodiimides may have variations in molecular structure. The polycarbodiimides may have functional groups such as an isocyanate group at opposite ends of its molecule or at any site of its molecule, or may have a branched molecular chain.

The method of producing the carbodiimide compound is not particularly limited, but any of various methods may be employed. For example, the carbodiimide compound may be prepared from an isocyanate compound.

Examples of the epoxy compound include N-glycidylphthalimide, N-glycidyl-4-methylphthalimide, N-glycidyl-4,5-dimethylphthalimide, N-glycidyl-3-methylphthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidylhexahydrophthalimide, N-glycidyl-1,2,3,6-tetrahydrophthalimide, N-glycidylmaleimide, N-glycidyl-α,β-dimethylsuccinimide, N-glycidyl-α-ethylsuccinimide, N-glycidyl-α-propylsuccinimide, N-glycidylbenzamide, N-glycidyl-p-methylbenzamide, N-glycidylnaphthamide, N-glycidylstearamide, N-methyl-4,5-epoxycyclohexane-1,2-dicarboxylimide, N-ethyl-4,5-epoxycyclohexane-1,2-dicarboxylimide, N-phenyl-4,5-epoxycyclohexane-1,2-dicarboxylimide, N-naphthyl-4,5-epoxycyclohexane-1,2-dicarboxylimide, N-tolyl-3-methyl-4,5-epoxycyclohexane-1,2-dicarboxylimide, o-phenylphenyl glycidyl ether, 2-methyloctyl glycidyl ether, phenyl glycidyl ether, 3-(2-xenyloxy)-1,2-epoxypropane, allyl glycidyl ether, butyl glycidyl ether, lauryl glycidyl ether, benzyl glycidyl ether, cyclohexyl glycidyl ether, α-cresyl glycidyl ether, p-t-butylphenyl glycidyl ether, methacrylic glycidyl ether, ethylene oxide, propylene oxide, styrene oxide, octylene oxide, hydroquinone diglycidyl ether, resorcinol diglycidyl ether, 1,6-hexanediol diglycidyl ether and hydrogenated bisphenol-A diglycidyl ether. Other examples of the epoxy compound include diglycidyl terephthalate, diglycidyl tetrahydrophthalate, diglycidyl hexahydrophthalate, dimethyl diglycidyl phthalate, phenylene diglycidyl ether, ethylene diglycidyl ether, trimethylene diglycidyl ether, tetramethylene diglycidyl ether and hexamethylene diglycidyl ether.

Specific examples of the oxazoline compound include 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphenoxy-2-oxazoline, 2-o-propylphenoxy-2-oxazoline, 2-o-phenylphenoxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline and 2-p-phenylphenyl-2-oxazoline. Other examples of the oxazoline compound include 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylene bis(2-oxazoline), 2,2'-m-phenylene bis(2-oxazoline), 2,2'-o-phenylene bis(2-oxazoline), 2,2'-p-phenylene bis(4-methyl-2-oxazoline), 2,2'-p-phenylene bis(4,4'-dimethyl-2-oxazoline), 2,2'-m-phenylene bis(4-methyl-2-oxazoline), 2,2'-m-phenylene bis(4,4'-dimethyl-2-oxazoline), 2,2'-ethylene bis(2-oxazoline), 2,2'-tetramethylene bis(2-oxazoline), 2,2'-hexamethylene bis(2-oxazoline), 2,2'-octamethylene bis(2-oxazoline), 2,2'-decamethylene bis(2-oxazoline), 2,2'-ethylene bis(4-methyl-2-oxazoline), 2,2'-tetramethylene bis(4,4'-dimethyl-2-oxazoline), 2,2'-9,9'-diphenoxyethane bis(2-oxazoline), 2,2'-cyclohexylene bis(2-oxazoline) and 2,2'-diphenylene bis(2-oxazoline). Further other examples of the oxazoline compound include polyoxazoline compounds containing any of the aforesaid compounds as a monomer unit, e.g., copolymers of styrene and 2-isopropenyl-2-oxazoline.

The amount of the reactive compound (E) to be added is preferably 0.1 to 20 parts by mass, more preferably 0.2 to 15 parts by mass, based on 100 parts by mass of the polylactic acid resin (A). If the amount is less than 0.5 parts by mass, it is difficult to provide the intended durability. In contrast, if the amount is greater than 20 parts by mass, the heat resistance is reduced. Further, this is economically disadvantageous and significantly impairs the color.

A pigment, a heat stabilizer, an antioxidant, an inorganic filler, plant fibers, reinforcement fibers, a weather resistant agent, a plasticizer, a lubricant, a mold release agent, an antistatic agent, a shock resistant agent, a compatibilizer or the like may be added to the inventive resin composition, as long as the properties of the resin composition are not significantly impaired.

Examples of the heat stabilizer and the antioxidant include hindered phenols, hindered amines, sulfur compounds, copper compounds and halides of alkali metals.

Examples of the inorganic filler include talc, mica, calcium carbonate, zinc carbonate, wollastonite, alumina, magnesia, calcium silicate, sodium aluminate, calcium aluminate, sodium aluminosilicate, magnesium silicate, glass balloon, carbon black, zinc oxide, antimony trioxide, zeolites, hydrotalcite, metal fibers, metal whiskers, ceramic whiskers, potassium titanate, boron nitride, graphites, carbon fibers and phyllosilicate. Where the phyllosilicate is blended in the resin composition, the gas barrier property of the resin composition is improved.

Examples of the plant fibers include kenaf fibers, bamboo fibers, jute fibers and other cellulose fibers.

Examples of the reinforcement fibers include organic reinforcement fibers such as aramide fibers, polyarylate fibers and liquid crystal polymer fibers, and glass fibers.

At least one plasticizer selected from aliphatic ester derivatives and aliphatic polyether derivatives may be used as the plasticizer. Specific examples of a compound for the plasticizer include glycerol diacetomonocaprate and glycerol diacetomonolaurate. The blending of the plasticizer promotes the dispersion of the crystal nucleus agent (B) into the polylactic acid resin (A).

A variety of carboxylic compounds are usable as the lubricant. In particular, metal carboxylates are preferred, and magnesium stearate and calcium stearate are particularly preferred.

A variety of carboxylic compounds are usable as the mold release agent. In particular, carboxylates and carboxylamides are advantageously used.

The shock resistant agent is not particularly limited, but a variety of shock resistant agents such as a (meth)acrylate shock resistant agent having a core-shell structure are usable. Specific examples of a commercially available shock resistant agent include METABLEN Series available from Mitsubishi Rayon Co., Ltd.

The compatibilizer is not particularly limited, but examples of the compatibilizer include graft copolymers having an olefin copolymer main chain. Specific examples of the compatibilizer include graft copolymers of poly(ethylene/glycidyl methacrylate) and polymethyl methacrylate, and graft copolymers of poly(ethylene/glycidyl methacrylate) and poly(acrylonitrile/styrene). Specific examples of a commercially available compatibilizer include MODIPER Series available from NOF Corporation.

The inventive resin composition may contain a second resin other than the polylactic acid resin (A). The second resin may be alloyed with the polylactic acid resin (A).

The second resin to be alloyed with the polylactic acid resin (A) is not particularly limited. Examples of the second resin include polyolefins, polyesters, polyamides, polycarbonates, polystyrenes, polymethyl (meth)acrylates, poly(acrylonitrile-butadiene-styrene) copolymers, liquid crystal polymers and polyacetals.

Examples of the polyolefins include polyethylenes and polypropylenes.

Examples of the polyesters include aromatic polyesters, aliphatic polyesters and many other polyesters. Specific examples of the aromatic polyesters include polyethylene terephthalates, polybutylene terephthalates, polyarylates and polybutylene adipate terephthalates. Examples of the aliphatic polyesters include polybutylene succinates, poly(butylene succinate-lactic acid) copolymers and polyhydroxybutyrates.

Other examples of the polyesters include polycyclohexylenedimethylene terephthalates, polyethylene naphthalates, polybutylene naphthalates, polyethylene isophthalate-co-terephthalates, polybutylene isophthalate-co-terephthalates, poly (ethylene terephthalate/cyclohexylenedimethylene terephthalates), poly (cyclohexylenedimethylene isophthalate-co-terephthalates), co-polyesters of a p-hydroxybenzoate residue and an ethylene terephthalate residue, and poly (trimethylene terephthalates) prepared from 1,3-propanediol which is a plant-derived material.

Examples of the polyamide include polyamide 6, polyamide 66, polyamide 610, polyamide 11, polyamide 12 and polyamide 6T.

In the present invention, the method for blending any of these compounds in the polylactic acid resin (A) is not particularly limited.

The inventive resin composition is molded or formed into a variety of products by injection molding, blowing, extrusion, inflation, inflation blowing or foam sheet forming, or sheet forming followed by vacuum forming, air pressure forming or vacuum air forming. That is, exemplary products of the resin composition include injection molded products, extruded films and sheets, products formed from the extruded films and sheets, blown hollow products, and products formed from the hollow products.

In the present invention, the injection molding is particularly preferred. An ordinary injection molding method as well as a gas injection molding method and an injection press molding method may also be employed. Injection molding conditions suitable for the inventive resin composition are, for example, such that the cylinder temperature is not lower than the melting point or the fluidization starting temperature of the resin composition, preferably 170° C. to 250° C., optimally 170° C. to 230° C., and the mold temperature is not higher than (the melting point of the resin composition −40° C.). If the cylinder temperature is too low, operational instability such as short molding and overloading are liable to occur. On the other hand, if the molding temperature or the cylinder temperature is too high, the resin composition will be decomposed, so that the resulting molded product is liable to suffer from reduction in strength and colorization.

The heat resistance of the inventive resin composition is further improved by promoting the crystallization of the resin. An exemplary method for this is to promote the crystallization in a mold during the injection molding. In this case, a molded product is retained in a mold kept at a temperature not lower than the glass transition temperature of the resin composition and not higher than (the melting point −40° C.) for a predetermined period, and then demolded. Even if the molded product is not subjected to the aforementioned procedure before being demolded, the crystallization of the product can be promoted by performing a heat treatment at a temperature not lower than the glass transition temperature and not higher than (the melting point −40° C.) after being demolded.

Specific examples of the molded product include: electrical appliance resin components such as housing components and housings for personal computers, housing components and housings for mobile phones, housing components for other OA appliances and connectors; automotive resin components such as bumpers, instrument panels, console boxes, garnishes, door trims, ceilings, floors and engine panels; agricultural materials such as containers and plant pots and agricultural machine resin components; fishery resin components such as floats and seafood processing containers; tableware such as dishes, cups, spoons and food containers; medical resin components such as syringes and infusion bags; residential, civil engineering and architectural resin components such as drainages, fences, tool boxes and construction wiring boards; greening resin components such as flower bed bricks and flower pots; leisure and miscellaneous resin components such as cooler boxes, fans and toys; and stationery resin components such as ball point pens, rulers and clips.

The inventive resin composition may be extruded or formed into films, sheets, pipes and hollow products. Exemplary products include agricultural multi films, construction sheets, blown bottles, and other various products.

EXAMPLES

The present invention will hereinafter be described more specifically by way of examples thereof.

The following methods were employed for measuring and evaluating the physical properties of resin compositions of examples and comparative examples. Further, the following ingredients were employed for producing the resin compositions.

Methods for Measurement and Evaluation
(1) D-Isomer Content

The polylactic acid was decomposed by adding about 0.3 g of the polylactic acid resin (A) or the resin composition to 6 mL of a methanol solution of 1N potassium hydroxide, sufficiently stirring the resulting mixture at 65° C., adding 450 µL of sulfuric acid to the solution, and stirring the resulting mixture at 65° C. Then, 5 mL of the decomposed polylactic acid sample, 3 mL of pure water and 13 mL of methylene chloride were mixed together and shaken. After the resulting mixture was allowed to stand still, about 1.5 mL of liquid was sampled from a lower organic layer, then filtered with a HPLC disk filter having a perforation diameter of 0.45 µm, and analyzed through gas chromatography by HP-6890 Series GC system available from Hewlett Packard Company. The percentage (%) of the peak area of methyl D-lactate in the total peak area of methyl lactates was calculated, which was defined as the D-isomer content (U.

(2) Melt Flow Rate (MFR)

The melt flow rate of the polylactic acid resin (A) or the resin composition was measured at 190° C. in conformity with JIS K7210.

(3) Molding Cycle

When a test piece specified by the ISO was molded under predetermined molding conditions by an injection molding machine, a minimum period (an injection period plus a retention period plus a cooling period) required before demolding the resulting test piece without deformation was determined, which was defined as the molding cycle. The upper limit of the molding cycle was set to 100 seconds. This is because a molding cycle of longer than 100 seconds significantly impairs the molding operability and significantly deteriorates the resin melted and retained in the cylinder, leading to a practical difficulty in molding.

(4) Thermal Deformation Temperature

The thermal deformation temperature was measured with a load of 0.45 MPa in conformity with ISO 75. At this time, a resin composition having a thermal deformation temperature higher than 100° C. was rated as "excellent" and represented by ⊙, and a resin composition having a thermal deformation temperature of 80° C. to 100° C. was rated as "good" and represented by ○. A resin composition having a thermal deformation temperature of 70° C. to 80° C. was rated as "inferior" and represented by Δ, and a resin composition having a thermal deformation temperature lower than 70° C. was rated as "bad" and represented by X.

(5) Crystallinity

Wide angle X-ray diffraction measurement was performed on a test piece molded at a mold temperature of 80° C. through a WAXD reflection film method by means of an X-ray diffraction analyzer (RAD-rB available from Rigaku Corporation), and the measurement results were analyzed by a multi-peak separation method to determine a crystal area ratio, which was defined as the crystallinity. Where the molding cycle was longer than 100 seconds, a test piece prepared in a molding cycle of 100 seconds was used for the measurement.

(6) Cool-Down Crystallization Calorific Value (ΔH) and Cool-Down Crystallization Peak Temperature After the sample was completely melted, the sample was cooled at a rate of 50° C./min. with the use of a DSC measurement device (Perkin Elmer Thermal Analysis). A crystallization calorific value (J/g) was calculated based on a peak area observed at this time. The temperature at which the top of the peak appears was defined as the crystallization peak temperature.

(7) Durability

A test piece molded in conformity with the ISO was exposed to a high temperature/high humidity environment at 50° C. at 50% RH for 72 hours, and then the flexural strength of the test piece was measured in conformity with ISO178. At this time, a test piece having a retention ratio of not less than 95% based on a value observed before the exposure was rated as "excellent" and represented by ⊙, and a test piece having a retention ratio of 80 to 95% was rated as "good" and represented by ○. A test piece having a retention ratio of 50 to 80% was rated as "inferior" and represented by Δ, and a test piece having a retention ratio of not greater than was rated as "bad" and represented by X.

Ingredients (1) Polylactic Acid Resin (A)

S-06: Produced by Toyota Motor Corporation, and having a D-isomer content of 0.2 mol % and an MFR of 4 g/10 min.

S-09: Produced by Toyota Motor Corporation, and having a D-isomer content of 0.1 mol % and an MFR of 6 g/10 min.

S-12: Produced by Toyota Motor Corporation, and having a D-isomer content of 0.1 mol % and an MFR of 8 g/10 min.

S-17: Produced by Toyota Motor Corporation, and having a D-isomer content of 0.1 mol % and an MFR of 11 g/10 min.

A-1: Produced by Toyota Motor Corporation, and having a D-isomer content of 0.6 mol % and an MFR of 2 g/10 min.

TE-4000: Produced by Unitika Ltd., and having a D-isomer content of 1.4% and an MFR of 10 g/10 min.

Synthesized resin 1: 2,000 g of L-lactide having a D-isomer content of 0.08 mol % and 1.4 g of hexanediol were put in a glass polymerization tube, and heated to be melted in a nitrogen stream. Thereafter, 0.4 g of dioctyl tin was added to the resulting melt, and allowed to react at 180° C. for 1 hour with stirring. After a lapse of 30 minutes, the inside pressure of the tube was reduced to 5 hPa, and then the resulting poly(L-lactic acid) resin was taken out. The poly (L-lactic acid) resin thus prepared had a D-isomer content of 0.08 mol and an MFR of 15 g/10 min.

(2) Crystal Nucleus Agent (B)

KX238B (a polylactic acid-based master batch containing 10 parts by mass of a crystal nucleus agent) produced by Toyota Motor Corporation N,N'-ethylene bis(12-hydroxystearamide): WX-1 produced by Kawaken Fine Chemicals Co., Ltd.

N,N',N"-tricyclohexyltrimesamide: TF-1 produced by New Japan Chemical Co., Ltd.

Dimethyl sodium 5 sulfoisophthalate: Produced by Tokyo Chemical Industry Co., Ltd.

Octane dicarboxylic acid dibenzoylhydrazide: T-1287N produced by Adeka Corporation (3) (Meth)acrylate Compound (C)

Ethylene glycol dimethacrylate: BLEMMER PDE-50 produced by NOF Corporation (4) Peroxide (D)

Di-t-butyl peroxide: PERBUTYL-D produced by NOF Corporation (5) Reactive Compound Isocyanate-modified carbodiimide: LA-1 (having an isocyanate content of 1 to 3 mass o) produced by Nisshinbo Chemical Inc.

Carbodiimide: EN-160 produced by Matsumoto Yushi-Seiyaku Co., Ltd.

(6) Crosslinking Agent

Hexamethylene diisocyanate (hereinafter abbreviated as "HMDI")

Example 1

As shown in Table 1, 90 parts by mass of the polylactic acid resin S-12 and 10 parts by mass of the crystal nucleus agent KX238B (containing a crystal nucleus agent in a proportion of 10 mass % (a net crystal nucleus agent amount of 1 part by mass)) were used. These were dry-blended, and supplied into a twin-screw extruder (TEM37BS produced by Toshiba Machine Co., Ltd.) from a proximal supply port of the extruder. Then, the resulting mixture was extruded at a rate of 15 kg/h with the screw of the extruder being rotated at a rotation speed of 200 rpm with the barrel of the extruder kept at 180° C. with the vent of the extruder being effected.

After the resulting pellets were dried in vacuum at 70° C. for 24 hours, test pieces (ISO type) for measurement of ordinary physical properties were produced from the pellets with a mold surface kept at temperatures of 80° C. and 100° C. by means of an injection molding machine IS-80G produced by Toshiba Machine Co., Ltd. When the test pieces were produced, the molding cycles were measured. Thereafter, the measurements were performed on the test pieces thus produced. Some of the test pieces were exposed to a high temperature/high humidity environment at 50° C. at 50% RH for 100 hours, and then their flexural properties were measured.

Examples 2 to 23 and Comparative Examples 1 to 7

Pellets of resin compositions were produced in substantially the same manner as in Example 1, except that different types of the polylactic acid resin, the crystal nucleus agent, the (meth)acrylate compound, the peroxide and the reactive compound were used in different kinds and amounts.

In the examples and the comparative examples, the (meth)acrylate compound and the peroxide were supplied into the cylinder of the twin screw extruder during the kneading of the polylactic acid resin and the crystal nucleus agent.

After the pellets thus produced were dried, test pieces (ISO type) for measurement of ordinary physical properties were produced. At this time, the molding cycles were measured. The measurements were performed on the test pieces thus produced.

The results of the evaluation of Examples 1 to 23 and Comparative Examples 1 to 7 are shown in Tables 1 and 2.

TABLE 1

| | Example | | | | | | | |
|---|---|---|---|---|---|---|---|---|
| | 1 | 2 | 3 | 4 | 5 | 6 | 7 | 8 |
| Formulation of resin composition (parts by mass) | | | | | | | | |
| Polylactic acid resin (A) | | | | | | | | |
| S-17 | | | | | | | 80 | |
| S-12 | 90 | 80 | 70 | 60 | 50 | | | |
| S-09 | | | | | | | | |
| S-06 | | | | | | | | 80 |
| A-1 | | | | | | 80 | | |
| TE-4000 | | | | 10 | 20 | 30 | | |
| Synthesized resin 1 | | | | | | | | |
| Crystal nucleus agent (B) | | | | | | | | |
| WX-1 | | | | | | | | |
| TF-1 | | | | | | | | |
| Dimethyl sodium 5-sulfoisophthalate | | | | | | | | |
| T-1287N | | | | | | | | |
| KX238B | 10 | 20 | 20 | 20 | 20 | 20 | 20 | 20 |
| Net amount of crystal nucleus agent | 1 | 2 | 2 | 2 | 2 | 2 | 2 | 2 |
| (Meth)acrylate compound (C) | | | | | | | | |
| Peroxide (D) | | | | | | | | |
| Reactive compound (E) | | | | | | | | |
| LA-1 | | | | | | | | |
| EN-160 | | | | | | | | |
| Crosslinking agent | | | | | | | | |
| HMDI | | | | | | | | |
| Physical properties of resin composition | | | | | | | | |
| MFR (g/10 min) | 9 | 9 | 9 | 9 | 9 | 2 | 12 | 4 |
| D-isomer content (%) | 0.1 | 0.1 | 0.2 | 0.3 | 0.5 | 0.5 | 0.1 | 0.1 |
| Evaluation of moldability | | | | | | | | |
| Mold temperature of 80° C. | | | | | | | | |
| Molding cycle (second) | 40 | 40 | 42 | 44 | 54 | 67 | 44 | 40 |
| Thermal deformation temperature | ◎ | ◎ | ◎ | ◎ | ◎ | ◎ | ◎ | ◎ |
| Crystallinity (%) | 46 | 48 | 46 | 42 | 43 | 42 | 48 | 48 |
| Mold temperature of 100° C. | | | | | | | | |
| Molding cycle (second) | 38 | 38 | 42 | 42 | 44 | 44 | 42 | 43 |
| Thermal deformation temperature | ◎ | ◎ | ◎ | ◎ | ◎ | ◎ | ◎ | ◎ |
| Thermal analysis | | | | | | | | |
| Crystallization calorific value (J/g) | 43 | 44 | 44 | 42 | 39 | 35 | 40 | 42 |
| Crystallization peak temperature (° C.) | 127 | 131 | 130 | 129 | 128 | 121 | 128 | 127 |
| Durability | | | | | | | | |
| Flexural property after wet heating | Δ | Δ | Δ | Δ | Δ | Δ | Δ | Δ |

TABLE 1-continued

|  | Example | | | | | | | |
|---|---|---|---|---|---|---|---|---|
|  | 9 | 10 | 11 | 12 | 13 | 14 | 15 | 16 |
| Formulation of resin composition (parts by mass) Polylactic acid resin (A) | | | | | | | | |
| S-17 | | | | | | | | |
| S-12 | | 95 | 98.3 | 78.5 | 95 | 99.5 | 100 | 90 |
| S-09 | | | | | | | | |
| S-06 | | | | | | | | |
| A-1 | | | | | | | | |
| TE-4000 | | | | | | | | |
| Synthesized resin 1 | 98 | | | | | | | |
| Crystal nucleus agent (B) | | | | | | | | |
| WX-1 | | | | | | | | |
| TF-1 | | | | | | | | |
| Dimethyl sodium 5-sulfoisophthalate | 2 | 5 | 0.2 | | | | | |
| T-1287N | | | | | | | | |
| KX238B | | | | 20 | | | | 10 |
| Net amount of crystal nucleus agent | | | | 2 | | | | 1 |
| (Meth)acrylate compound (C) | | | | | 1 | 0.05 | 0.1 | 0.1 |
| Peroxide (D) | | | | | 2 | 0.1 | 0.2 | 0.2 |
| Reactive compound (E) | | | | | | | | |
| LA-1 | | | | 1.5 | 5 | 0.5 | | |
| EN-160 | | | 1.5 | | | | | |
| Crosslinking agent | | | | | | | | |
| HMDI | | | | | | | | |
| Physical properties of resin composition | | | | | | | | |
| MFR (g/10 min) | 15 | 9 | 9 | 9 | 2 | 4 | 3 | 3 |
| D-isomer content (%) | 0.08 | 0.1 | 0.1 | 0.1 | 0.1 | 0.1 | 0.1 | 0.1 |
| Evaluation of moldability Mold temperature of 80° C. | | | | | | | | |
| Molding cycle (second) | 44 | 40 | 44 | 36 | 40 | 50 | 40 | 34 |
| Thermal deformation temperature | ◎ | ◎ | ◎ | ◎ | ○ | ○ | ○ | ◎ |
| Crystallinity (%) | 47 | 48 | 47 | 47 | 45 | 42 | 43 | 48 |
| Mold temperature of 100° C. | | | | | | | | |
| Molding cycle (second) | 38 | 38 | 44 | 41 | 39 | 44 | 42 | 38 |
| Thermal deformation temperature | ◎ | ◎ | ◎ | ◎ | ◎ | ◎ | ◎ | ◎ |
| Thermal analysis | | | | | | | | |
| Crystallization calorific value (J/g) | 40 | 42 | 33 | 45 | 42 | 32 | 39 | 40 |
| Crystallization peak temperature (° C.) | 123 | 131 | 124 | 127 | 124 | 123 | 123 | 125 |
| Durability | | | | | | | | |
| Flexural property after wet heating | Δ | Δ | ◎ | ◎ | ◎ | ○ | Δ | Δ |

|  | Example | | | | | | |
|---|---|---|---|---|---|---|---|
|  | 17 | 18 | 19 | 20 | 21 | 22 | 23 |
| Formulation of resin composition (parts by mass) Polylactic acid resin (A) | | | | | | | |
| S-17 | | | | | | | |
| S-12 | 80 | 70 | 50 | | 99 | 99.5 | 99 |
| S-09 | | | | 90 | | | |
| S-06 | | | | | | | |
| A-1 | | | | | | | |
| TE-4000 | | 10 | 30 | | | | |
| Synthesized resin 1 | | | | | | | |
| Crystal nucleus agent (B) | | | | | | | |
| WX-1 | | | | | 1 | | |
| TF-1 | | | | | | 0.5 | |
| Dimethyl sodium 5-sulfoisophthalate | | | | | | | |
| T-1287N | | | | | | | 1 |
| KX238B | 20 | 20 | 20 | 10 | | | |
| Net amount of crystal nucleus agent | 2 | 2 | 2 | 1 | | | |
| (Meth)acrylate compound (C) | 0.1 | 0.1 | 0.1 | 0.1 | 0.1 | 0.1 | 0.1 |
| Peroxide (D) | 0.2 | 0.2 | 0.2 | 0.2 | 0.2 | 0.2 | 0.2 |

TABLE 1-continued

| Reactive compound (E) | | | | | | | |
|---|---|---|---|---|---|---|---|
| LA-1 | | | | | | | |
| EN-160 | | | | | | | |
| Crosslinking agent | | | | | | | |
| HMDI | | | | | | | |
| Physical properties of resin composition | | | | | | | |
| MFR (g/10 min) | 3 | 3 | 3 | 3 | 3 | 3 | 3 |
| D-isomer content (%) | 0.1 | 0.2 | 0.5 | 0.1 | 0.1 | 0.1 | 0.1 |
| Evaluation of moldability | | | | | | | |
| Mold temperature of 80° C. | | | | | | | |
| Molding cycle (second) | 32 | 38 | 44 | 36 | 36 | 39 | 36 |
| Thermal deformation temperature | ◎ | ◎ | ◎ | ◎ | ◎ | ◎ | ◎ |
| Crystallinity (%) | 48 | 47 | 47 | 47 | 47 | 48 | 47 |
| Mold temperature of 100° C. | | | | | | | |
| Molding cycle (second) | 38 | 42 | 46 | 40 | 44 | 44 | 44 |
| Thermal deformation temperature | ◎ | ◎ | ◎ | ◎ | ◎ | ◎ | ◎ |
| Thermal analysis | | | | | | | |
| Crystallization calorific value (J/g) | 40 | 41 | 34 | 33 | 32 | 36 | 33 |
| Crystallization peak temperature (° C.) | 121 | 128 | 125 | 124 | 114 | 117 | 121 |
| Durability | | | | | | | |
| Flexural property after wet heating | Δ | Δ | Δ | Δ | Δ | Δ | Δ |

TABLE 2

| | Comparative Example | | | | | | |
|---|---|---|---|---|---|---|---|
| | 1 | 2 | 3 | 4 | 5 | 6 | 7 |
| Formulation of resin composition (parts by mass) | | | | | | | |
| Polylactic acid resin (A) | | | | | | | |
| S-17 | | | | | | | |
| S-12 | | 30 | 10 | | 100 | 99.99 | 99 |
| S-09 | | | | | | | |
| S-06 | | | | | | | |
| A-1 | | | | | | | |
| TE-4000 | 50 | 70 | 90 | 99 | | | |
| Synthesized resin 1 | | | | | | | |
| Crystal nucleus agent (B) | | | | | | | |
| WX-1 | | | | | 1 | | |
| TF-1 | | | | | | | |
| Dimethyl sodium 5-sulfoisophthalate | | | | | | 0.01 | |
| T-1287N | | | | | | | |
| KX238B | 20 | 20 | 10 | | | | |
| Net amount of crystal nucleus agent | 2 | 2 | 1 | | | | |
| (Meth)acrylate compound (C) | | | | 0.1 | 0.1 | | |
| Peroxide (D) | | | | 0.2 | 0.2 | | |
| Reactive compound (E) | | | | | | | |
| LA-1 | | | | | | | |
| EN-160 | | | | | | | |
| Crosslinking agent | | | | | | | |
| HMDI | | | | | | | 1 |
| Physical properties of resin composition | | | | | | | |
| MFR (g/10 min) | 9 | 9 | 3 | 3 | 9 | 9 | 9 |
| D-isomer content (%) | 0.8 | 1.0 | 1.3 | 1.4 | 0.1 | 0.1 | 0.1 |
| Evaluation of moldability | | | | | | | |
| Mold temperature of 80° C. | | | | | | | |
| Molding cycle (second) | >100 | >100 | >100 | >100 | >100 | >100 | >100 |
| Thermal deformation temperature | — | — | — | — | — | — | — |
| Crystallinity (%) | 40 | 39 | 36 | 35 | <30 | <30 | <30 |
| Mold temperature of 100° C. | | | | | | | |
| Molding cycle (second) | 42 | 46 | 46 | 62 | >80 | >80 | >80 |
| Thermal deformation temperature | ◎ | Δ | ◎ | ◎ | — | — | — |

TABLE 2-continued

|  | Comparative Example | | | | | | |
|---|---|---|---|---|---|---|---|
|  | 1 | 2 | 3 | 4 | 5 | 6 | 7 |
| Thermal analysis | | | | | | | |
| Crystallization calorific value (J/g) | 38 | 34 | 27 | 4.4 | — | — | — |
| Crystallization peak temperature (° C.) | 126 | 123 | 114 | 93 | — | — | — |
| Durability | | | | | | | |
| Flexural property after wet heating | Δ | Δ | Δ | Δ | Δ | Δ | Δ |

As apparent from Tables 1 and 2, the resin compositions of Examples 1 to 23 were excellent in moldability and heat resistance. The crystallinities of these resin compositions indicated that the crystallization sufficiently proceeded in the resin compositions.

The resin compositions of Examples 16 to 23, which each contained the crystal nucleus agent and further contained both the (meth)acrylate compound and the peroxide, were particularly excellent in moldability. Except for the resin composition of Example 19 which had a higher D-isomer content (0.5 mass %), the resin compositions of Examples were moldable at a mold temperature of 80° C. in a molding cycle of shorter than 40 seconds. The resin composition of Example 19 was more excellent in moldability than the resin compositions of Examples 5 and 6 which each had substantially the same D-isomer content.

The products of Examples 11 to 14, which were molded from the resin compositions each containing the carbodiimide compound as the reactive compound, were excellent in the durability.

The resin composition of Example 10, which contained a greater amount (5 parts by mass) of the crystal nucleus agent, did not have a notable effect in moldability as compared with the other examples.

The resin compositions of Comparative Examples 1 to 4, which each contained the crystal nucleus agent for promotion of crystallization but had a higher D-isomer content, were not moldable at a mold temperature of 80° C.

The resin compositions of Comparative Examples 5 and 6, which each had a sufficiently low D-isomer content but were given no or insufficient consideration for the promotion of the crystallization, were not moldable at a mold temperature of 80° C.

The resin composition of Comparative Example 7, which had a sufficiently low D-isomer content and contained HMDI but no (meth)acrylate compound, was not moldable at a mold temperature of 80° C.

What is claimed is:

1. A crystalline polylactic acid resin composition comprising:
   95 to 99.97 parts by mass of a polylactic acid resin (A) having a D-isomer content of not greater than 0.6 mol % or not less than 99.4 mol %; and
   0.03 to 5 parts by mass of a crystal nucleus agent (B), wherein the crystal nucleus agent (B) is an organic sulfonate which is a metal salt of dimethyl 5-sulfoisophthalate.

2. A product molded from a crystalline polylactic acid resin composition as recited in claim 1.

* * * * *